Dec. 20, 1966     M. L. HAYES     3,292,261
GIRDLE AND BRASSIERE MEASURING TAPE
Filed Feb. 12, 1965
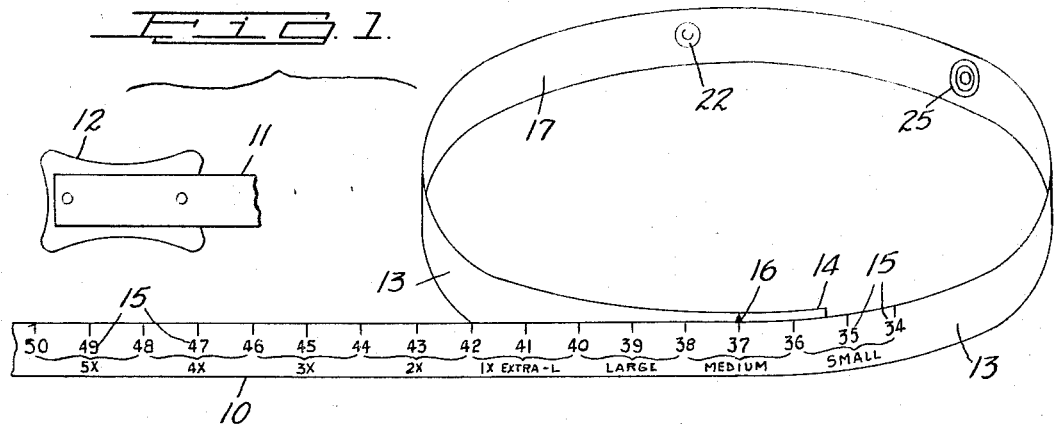
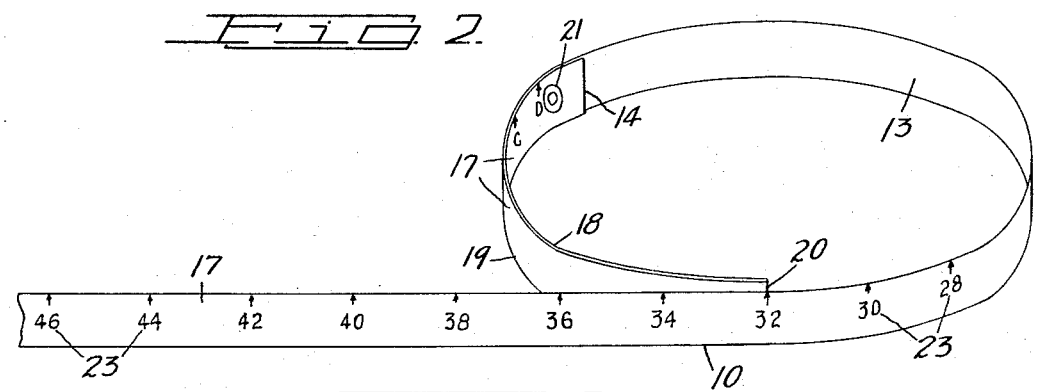
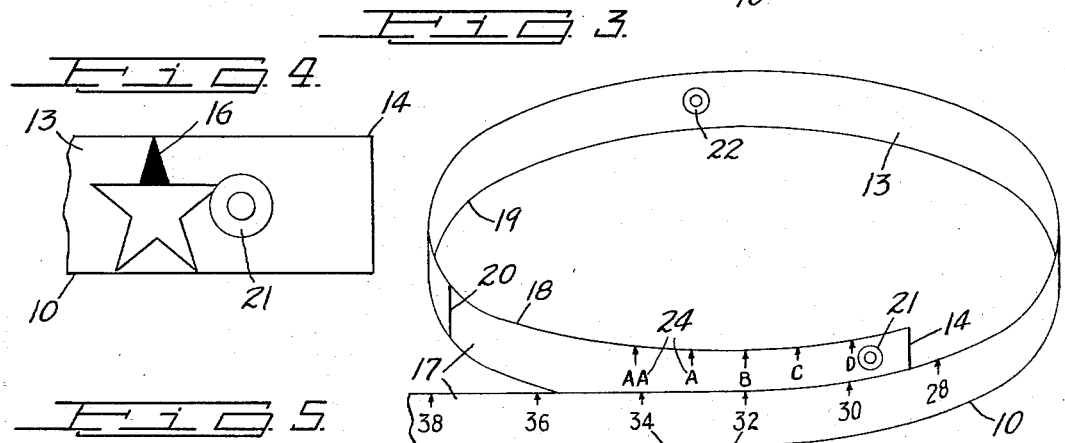
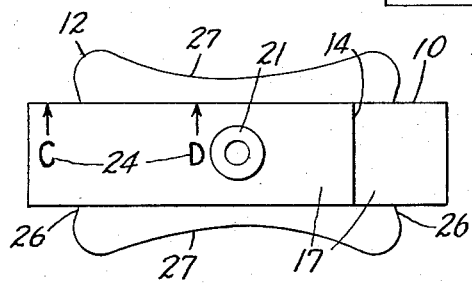
INVENTOR.
MADELINE L. HAYES
BY
Howard E. Thompson
ATTORNEY United States Patent Office 3,292,261
Patented Dec. 20, 1966

3,292,261
GIRDLE AND BRASSIERE MEASURING TAPE
Madeline L. Hayes, Douglaston, N.Y., assignor to William Gluckin & Company, Inc., New York, N.Y., a corporation of New York
Filed Feb. 12, 1965, Ser. No. 432,199
6 Claims. (Cl. 33—2)

This invention relates to a tape for use in taking measurements upon the body of a purchaser in facilitating purchase of garments for proper fit and particularly such garments as girdles and brassieres. More particularly, the invention deals with a measuring tape of the character described, wherein, in taking measurements for proper fitting of a brassiere, one end portion of the tape has a predetermined length folded upon itself and held in this folded position in measuring the purchaser around the chest beneath and in close proximity to the breasts, which folded portion of the tape is then extended in taking a measurement over the breasts in determining the size of the cup or pocket of the brassiere.

Still more particularly, the invention deals in a tape of the character described, wherein one end portion thereof includes an enlarged recessed holder, upon which the tape can be wound in the storage and shipment thereof.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a bracketed slightly perspective view of a tape made according to my invention, exposing the scale used in taking hip measurements for selecting the size of girdle for proper fit upon the body of the purchaser, one end portion of the tape being looped as in taking a measurement and the mounting end portion of the tape being shown detached.

FIG. 2 is a view, similar to FIG. 1, illustrating only one end portion of the tape and exposing the scale for use in taking a brassiere measurement, the parts, as shown in FIG. 2, taking a measurement around the chest beneath the breasts.

FIG. 3 is a view, similar to FIG. 2, illustrating the tape in the position for taking a measurement over and around the breasts of the purchaser.

FIG. 4 is an enlarged detail view of the free end of a tape exposing the surface illustrated in FIG. 1 and showing a marker used in taking measurements; and FIG. 5 is an enlarged plan view of the mounting end portion of the tape with the tape wound and stored thereon.

In the sale of girdles and brassieres, particularly in stores where the girdles and brassieres are purchased by the customer from counter storage and display, problems have existed in the purchaser buying a girdle of improper size and/or fit upon the body of the wearer. To provide a practical solution of this problem, I provide a single measuring tape which will be used by the sales clerks in departments selling girdles and brassieres for quickly and easily taking the measurements of a purchaser to aid the purchaser in selecting the garment of proper size and fit upon the body.

In the accompanying drawing, I have shown one adaptation of my invention, wherein an elongated tape 10 of any suitable flexible material has fixed to one end 11 thereof a recessed mounting card or plate 12, as seen in FIG. 1 of the drawing. The tape has two different scales on opposed surfaces thereof. In FIG. 1, the exposed surface 13 has, at a predetermined distance from the free end 14 of the tape scale, markings 15 from "34" to "50," inclusive, predetermined groups of markings being identified by the words "SMALL," "MEDIUM," "LARGE" and "1X EXTRA-L," signifying extra large. Further, there are groupings "2X" to "5X," inclusive.

Adjacent the end portion 14, the surface 13 has a star-like gauge 16, shown clearly in FIG. 4 of the drawing, with which the numerals "34" to "50" will register in taking a predetermined measurement around the hips of a purchaser. In the illustration given in FIG. 1, the gauge 16 is registering with the numeral "37," indicating that the hip measurement would be 37 and require a medium size garment. Any range between "36" and "38" closest to "37" would take the medium size; whereas, if the measurement were closer to "36," then it is for the sales clerk to judge whether a small size should be used and the same would apply if the measurement is closely adjacent "38," in which event, a large size would be selected.

The foregoing applies to all of the groups of identified measurements up to and including "5X."

The opposed surface 17 of the tape, which is exposed in FIGS. 2 and 3 of the drawing, will be the brassiere measurement surface of the tape. The free end portion of the tape has an end 18 foldable upon the adjacent portion 19 of the tape on a line 20 vertically marked to provide a gauge, similar to the gauge 16. The free end portion of 18 and the part of 19 have cooperating snap fasteners for retaining 18 and 19 in their assembled position, as shown in FIG. 2 of the drawing. The fastener of 18 is shown diagrammatically at 21 and the fastener of 19 is shown at 22. Arranged upon the exposed surface 17 of the tape, as seen in FIGS. 2 and 3, are the numerals "28," "30," etc. up to the numeral "46" designated by the reference character 23. These numerals, when registering with or in close proximity to the gauge 20 with the parts in the position shown in FIG. 2, will take measurements of the body around the chest directly below and in close proximity to the breasts and, in the illustration given in FIG. 2, the gauge 20 registers with the numeral "32," which will designate the general size of brassiere to be selected. Then, to obtain the proper cup size, the end portion 18 is detached, as shown in FIG. 3, and other scale markings "AA" to "D," as seen at 24 in FIG. 3, are brought into registration with the size numeral determined in FIG. 2, namely the measurement "32" when the tape is placed around the chest and over the breasts and, as illustrated in FIG. 3, the size of cup to be selected in the chosen garment is cup "B."

In taking the measurements of FIGS. 2 and 3, a target-type of marking 25 on the surface 17, note FIG. 1, is preferably positioned centrally of the body. However, this particular marking is not absolutely necessary, as the measurements taken, as in FIGS. 2 and 3, can be with the tape in any desired position upon the body, which would be most suitable to the sales clerk taking the measurement.

Considering FIG. 5 of the drawing, it will appear that the card 12 has recessed ends 26, around which the tape 10 can be wound for storage, as illustrated in said figure. The card also preferably has recessed sides, as indicated at 27. This position of the tape can be utilized in the packaging and shipment thereof, as well as in storage for convenient use by the sales clerk or clerks in a store.

A tape of the character defined will materially expedite sales of garments of the kind under consideration, as well as ensuring satisfaction to the customer on making the purchase. The various scales used on the tape can be consistent with garments of a predetermined manufacturer who will supply the tape for use by the sales clerks and the scale markings further can be so arranged as to compensate for clothing worn by the purchaser at the time that measurement is taken, keeping in mind that this measurement might be slightly greater than actual measurement taken directly upon the body of the wearer. In this connection, it will be understood that tapes of the type and kind under consideration can be used in establishments where actual body measurements are taken and, in such uses, the scale markings will be consistent with this use.

Having fully described my invention, what I claim as new and desire to secure by Letters Patent is:

1. A girdle and brassiere measuring tape comprising an elongated tape-like strand of flexible material, one surface of the tape having scale markings thereon for taking hip measurements for girdles, said markings registering with a gauge at one end portion of said surface of the tape, the other surface of the tape having two sets of scale markings thereon, one set of markings measuring the chest adjacent and beneath the breasts of a person, the other set of markings being arranged adjacent said end portion of the tape on said second surface for indicating the cup-size of a brassiere to be selected in a predetermined known size, said end portion of the tape having a predetermined length foldable upon the adjacent part of the tape in taking the chest measurement adjacent and beneath the breasts, the fold having a gauge marking registering with the scale markings on the second named surface of the tape in determining the brassiere size, and the scale marking of the determined size registering with one of the cup scale markings indicating the cup size to be selected when said folded end portion of the tape is in extended position and placed around the chest and over the breasts of the person.

2. A tape as defined in claim 1, wherein means is employed for retaining the folded end portion of the tape in folded position when taking said chest brassiere measurement.

3. A tape as defined in claim 1, wherein the other end portion of the tape includes a mounting card on which the tape can be wound in packaging and storing thereof.

4. A tape as defined in claim 1, wherein the girdle markings on the first surface of the tape comprise the numerals "34" to "50" inclusive, and said numerals being bracketed into groups designated by the headings "SMALL," "MEDIUM," "LARGE" and "1X" to "5X".

5. A tape as defined in claim 4, wherein the scale markings on the other surface of the tape contain the numerals "28" to "46" inclusive in one set and "AA" to "D" in the other set.

6. A tape as defined in claim 1, wherein the scale markings on the second named surface of the tape contain the numerals "28" to "46" inclusive in one set and "AA" to "D" in the other set.

References Cited by the Examiner

UNITED STATES PATENTS

| 869,264 | 10/1907 | Ricciardi | 33—2 |
| 1,431,873 | 10/1922 | Clausing | 33—179 X |
| 2,575,343 | 11/1951 | Heiman | 33—2 |
| 2,806,286 | 9/1957 | Weiner | 33—2 |

OTHER REFERENCES 1,060,608, German printed application, July 1959.

LEONARD FORMAN, *Primary Examiner.*